United States Patent
Gebauer et al.

(10) Patent No.: US 11,015,538 B2
(45) Date of Patent: May 25, 2021

(54) METHOD FOR CONTROLLING A SUPERCHARGING SYSTEM

(71) Applicant: VOLKSWAGEN AKTIENGESELLSCHAFT, Wolfsburg (DE)

(72) Inventors: Stefan Gebauer, Wolfsburg (DE); Matthias Huebner, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/690,983

(22) Filed: Nov. 21, 2019

(65) Prior Publication Data
US 2020/0165989 A1 May 28, 2020

(30) Foreign Application Priority Data
Nov. 22, 2018 (DE) ...................... 10 2018 220 094.7

(51) Int. Cl.
*F02D 41/00* (2006.01)
*F02D 41/14* (2006.01)

(52) U.S. Cl.
CPC ..... *F02D 41/0007* (2013.01); *F02D 41/1448* (2013.01)

(58) Field of Classification Search
CPC .......... F02B 37/12; F02B 37/22; F02B 37/24; F02D 23/00; F02D 41/0007; F02D 41/1448; F02D 41/145; F02D 2200/0406; F02D 2200/1002; F02D 2250/34; Y02T 10/12
See application file for complete search history.

(56) References Cited

U.S. PATENT DOCUMENTS

| | | | |
|---|---|---|---|
| 5,850,737 A | 12/1998 | Aschner et al. | |
| 6,662,562 B2 | 12/2003 | Engel et al. | |
| 6,718,767 B1 * | 4/2004 | Caddy | F02D 41/0007 60/602 |

(Continued)

FOREIGN PATENT DOCUMENTS

| | | |
|---|---|---|
| DE | 195 31 871 C1 | 11/1996 |
| DE | 100 10 978 A1 | 9/2001 |

(Continued)

*Primary Examiner* — Brandon D Lee
(74) *Attorney, Agent, or Firm* — Muncy, Geissler, Olds & Lowe, P.C.

(57) ABSTRACT

A method for controlling a supercharging system for an internal combustion engine, the supercharging stage including a compressor and a turbine, and the turbine being settable with the aid of a VTG driving circuit. The method including: detecting an operating state setpoint variable, setting a maximum VTG control criterion for implementing the torque increase by an increase in a boost pressure. The setting of the maximum VTG control criterion comprising: ascertaining a setpoint boost pressure; ascertaining a VTG setpoint position as a function of the setpoint boost pressure; ascertaining an actual exhaust gas back pressure; ascertaining an actual exhaust gas pressure downstream from the turbine; ascertaining a maximum exhaust gas back pressure, taking into account the actual exhaust gas pressure downstream from the turbine; determining the VTG control criterion, based on the difference between the actual exhaust gas back pressure and the maximum exhaust gas back pressure.

18 Claims, 4 Drawing Sheets

(56) References Cited

U.S. PATENT DOCUMENTS

| | | |
|---|---|---|
| 7,954,319 B2 | 6/2011 | Lanz et al. |
| 9,482,147 B2 | 11/2016 | Zhu et al. |
| 9,822,697 B2 | 11/2017 | Ge et al. |
| 2007/0251233 A1 | 11/2007 | Bardoll et al. |
| 2015/0345377 A1* | 12/2015 | Ge .................. F02D 41/1447 415/1 |
| 2017/0335780 A1* | 11/2017 | Dixon ................. F02D 41/0072 |

FOREIGN PATENT DOCUMENTS

| | | |
|---|---|---|
| DE | 10 2006 009 864 A1 | 9/2007 |
| DE | 10 2006 019 255 A1 | 10/2007 |
| DE | 10 2008 005 121 A1 | 7/2009 |
| DE | 10 2008 018 193 B3 | 9/2009 |
| DE | 10 2008 063 935 A1 | 6/2010 |
| DE | 10 2013 113 645 A1 | 11/2014 |
| DE | 10 2014 208 092 A1 | 10/2015 |
| DE | 10 2014 210 026 A1 | 11/2015 |
| DE | 10 2015 107 803 A1 | 12/2015 |
| DE | 10 2014 226 771 A1 | 6/2016 |
| DE | 10 2015 214 039 A1 | 1/2017 |
| DE | 10 2017 107 297 A1 | 10/2018 |
| EP | 1 178 192 A2 | 2/2002 |
| EP | 1 302 644 A1 | 4/2003 |
| EP | 3 078 833 A1 | 10/2016 |

* cited by examiner

METHOD FOR CONTROLLING A SUPERCHARGING SYSTEM

This nonprovisional application claims priority under 35 U.S.C. § 119(a) to German Patent Application No. 10 2018 220 094.7, which was filed in Germany on Nov. 22, 2018, and which is herein incorporated by reference.

BACKGROUND OF THE INVENTION

Field of the Invention

The present invention relates to a method and a control system for controlling a supercharging system for an internal combustion engine.

Description of the Background Art

Supercharging systems for internal combustion engines, in particular in the automotive area, are generally known to increase the boost pressure in the cylinders of the internal combustion engine, so that more and more highly compressed air is available for the combustion of a greater fuel quantity, and a power increase of the internal combustion engine (ICE) is thus achieved.

Turbochargers and compressors, for example, are known for increasing the boost pressure. Turbochargers comprise a compressor, and they may be either provided with a separate drive which is mechanically coupled with the compressor (e.g. an electric motor) or mechanically coupled with a turbine, which is driven by the exhaust gas of the internal combustion engine.

Exhaust gas turbochargers of this type are now the most common approach in the automotive area for increasing the boost pressure. Modern exhaust gas turbochargers are equipped with a bypass valve, also referred to as a "waste gate," for improved power control, and/or they are equipped with a variable turbine geometry, which includes adjustable, fixed guide vanes, with the aid of which the effective flow cross section may be decreased or expanded. The gas throughput may be varied during the adjustment of the positioning angle of the guide blades. The positioning angle of the guide blades is typically regulated or controlled in such a way that the power of the turbocharger is increased by reducing the flow cross section for little gas throughput and high power demand and by enlarging the flow cross section for high gas throughput and low power demand. The boost pressure, with the aid of which the air for combustion is pushed into the cylinder, is thus increased or reduced. This boost pressure is one of the crucial factors for the available power potential of the internal combustion engine.

A method is known from DE 10 2008 005 121 A1, in which the variable turbine geometry (VTG; adjustable guide vanes) is set in such a way that the turbine provides a predefined throughput.

It is also known from EP 1 178 192 A2 to control the VTG as a function of other operating parameters of the internal combustion engine (e.g. a diesel engine). Parameters of this type may be the rotational speed, the oil consumption, the cooling water temperature or other variables. DE 10 2008 063 935 A1 relates to a method, in which predicted values for the boost pressure and the exhaust gas back pressure are compared with corresponding setpoint values for a transient operating state (positive abrupt load change), and associated damper pulses are calculated, which result in an output damper pulse, from which a driving signal (pilot duty factor) is ascertained for setting the VTG.

It is also known from DE 10 2014 210 026 A1 to control the supercharging system as a function of a setpoint boost pressure and an ascertained boost pressure buildup adaptation. Another method for adapting an actual boost pressure to a setpoint boost pressure by adjusting the turbine geometry (rotary vanes in this case) is known from DE 10 2008 005 121 A1. Efficiency scatter may be prevented thereby.

In the known approaches, however, the problem may exist that the startup performance is unable to be optimally set. In these known approaches, the driving of a turbine actuator (waste gate valve and/or VTG) may be used, while only setpoint state variables are used for the ascertainment part on the exhaust gas side (upstream and downstream from the turbine). However, these variables may also be essential for forming the effective engine torque or the available power, due to the charge cycle losses.

SUMMARY OF THE INVENTION

It is therefore an object of the present invention to provide a method and control system for controlling a supercharging system.

According to an exemplary embodiment of the invention, a method is provided for controlling a supercharging system with a supercharging stage for an internal combustion engine. The supercharging stage comprises a compressor and a turbine, and the turbine is settable with the aid of a pressure control, in particular a VTG control. The method includes: detecting an operating state setpoint variable ($M_{M\text{-}soll}$); setting a maximum VTG control criterion ($u_{max}$) for implementing the torque increase by an increase in a boost pressure ($p_2$), the setting of the maximum VTG control criterion ($u_{max}$) comprising: ascertaining a setpoint boost pressure ($p_{2soll}$); ascertaining a VTG setpoint position ($u_{soll}$) as a function of the setpoint boost pressure ($p_{2soll}$); ascertaining an actual exhaust gas back pressure ($p_{31st}$); ascertaining an actual exhaust gas pressure ($p_{4ist}$) downstream from the turbine (8); ascertaining a maximum exhaust gas back pressure ($p_{3max}$), taking into account the actual exhaust gas pressure; ($p_{4ist}$); determining the VTG control criteria ($u_{max}$), taking into account the difference between the actual exhaust gas back pressure ($p_{31st}$) and the maximum exhaust gas back pressure ($p_{3max}$), whereby the VTG control criterion ($u_{max}$) of the VTG setpoint position ($u_{soll}$) is limited in such a way that an accelerated adaptation of an actual boost pressure ($p_{2ist}$) to the setpoint boost pressure ($p_{2soll}$) takes place with respect to an adaptation of the actual boost pressure ($p_{2ist}$) to the setpoint boost pressure ($p_{2soll}$) without taking into account the VTG control criterion ($u_{max}$).

A control system is also provided for a supercharging system for an internal combustion engine, the control system being configured to carry out the method.

Also, an internal combustion engine is provided, including a supercharging system which has a supercharging stage, the supercharging stage including a compressor and a drive, and including a control system according to the invention.

Further, a motor vehicle is provided, which includes an internal combustion engine according to the invention.

As mentioned at the outset, supercharging systems are known, in particular including an exhaust gas turbocharger having a variable turbine geometry (VTG), and or including a waste gate (at least one bypass valve). The guide vanes of the exhaust gas turbocharger may typically be varied at different velocities. This means that the flow speed is rapidly increased when the provided boost pressure is to be greatly increased, for example to accommodate an abrupt change in the power or torque demand (clear acceleration request) to the internal combustion engine.

It has been shown that a strong (rapid) tightening of the guide vanes typically also results in a high exhaust gas back pressure and this in charge cycle losses, which, in turn, counteracts the effective torque buildup of the internal combustion engine. This condition may be explained by the fact that the effective engine torque is crucial for the driving force at the wheel (and thus the acceleration of a motor vehicle). The effective engine torque corresponds to the difference between the inner engine torque and a loss torque. The loss torque comprising charge cycle losses, ancillary unit consumptions and friction.

The charge cycle losses are approximately proportionate to the scavenging gradient (pressure difference) between the exhaust gas back pressure on the outlet side and the boost pressure on the inlet side of the generating set. This was ascertained based on the observation of a cycle process of a real internal combustion engine.

To increase the effective engine torque or the vehicle acceleration, two components are available, which may be influenced by setting the VTG position:

On the fresh air side (during the supply of fresh air to the cylinders), a rapid or high boost pressure buildup may be implemented. An increased injection quantity of fuel may thus be released. This results in a faster or higher buildup of the inner moment (torque due to the combustion in the cylinder).

On the exhaust gas side, the charge cycle losses are to be reduced or influenced in that the progression of the VTG position co-determines the progression of the exhaust gas back pressure (e.g. due to a smaller buildup of the exhaust gas back pressure).

It has surprisingly been shown that a long and more vigorous closing of the VTG (reduction in the minimum cross-sectional surface, i.e. reduced so-called minflow) induces a more vigorous or faster buildup of the exhaust gas back pressure. However, the influence on the boost pressure development (on the fresh air side) and the vehicle acceleration is relatively slight. This indicates that the energy of the exhaust gas back pressure buildup may be converted to an increased charger rotational speed and thus an increased boost pressure buildup only to a greatly limited extent. This is due to the efficiency characteristic of the turbocharger. The approach pursued in this invention lies in limiting the loss torque, indeed by limiting the exhaust gas back pressure. The buildup of the boost pressure is thus optimized, and the effective torque is thus increased more rapidly.

The setting of the exhaust gas turbocharger geometry (VTG) according to the invention for limiting the exhaust gas back pressure partially reduces the unusable enthalpy upstream from the turbine. This effect is particularly clear when using an exhaust gas turbocharger having a reduced minimal mass flow (minflow). By reducing the enthalpy, the boost pressure buildup is simultaneously implemented faster. The limiting of the exhaust gas back pressure favors two desirable effects:

faster boost pressure buildup and thus a faster buildup of the inner engine torque (due to a higher injection quantity); and fewer charge cycle losses, due to the limiting of the exhaust gas back pressure.

The effective torque and the wheel acceleration torque of the vehicle essential for the acceleration thus increases compared to conventional driving functionalities.

According to the invention, this is achieved in that an operating state setpoint variable is first detected, and it may be, for example, a setpoint torque or also a so-called driver request (full load request), which is output to a vehicle control system by actuating the gas pedal. By setting a control criterion of the adjustable turbine geometry (VTG control criterion), an increase in the boost pressure is implemented for implementing a desired torque increase.

In connection with this invention, the terms control, setting, driving, control, regulation also comprise control systems in the actual sense (without feedback) as well as regulating circuits (having one or multiple control loops).

The steps for setting or adjusting the exhaust gas back press with the aid of this maximum VTG control criterion comprise, in particular, the following:

A setpoint boost pressure is first ascertained (for example from a characteristic map), which is suitable or optimized for the targeted acceleration, the desired (full) load state or the targeted torque increase. As a function thereof, a VTG setpoint position may be ascertained, during whose setting, however, the undesirable enthalpy accumulation may result, due to an excessively high exhaust gas back pressure. To limit this setpoint position, the following is therefore provided: the ascertainment (by measurement, modeling, calculation, etc.) of an actual exhaust gas back pressure, the ascertainment (by measurement, modeling, calculation, etc.) of an actual exhaust gas pressure downstream from the turbine and the ascertainment of a maximum exhaust gas back pressure, taking into account the actual exhaust gas pressure downstream from the turbine. To determine the VTG control criterion, the difference between the actual exhaust gas back pressure and the maximum exhaust gas back pressure is taken into account. On this basis, a maximum VTG control criterion is ascertained, which limits the already present VTG setpoint position in such a way that an accelerated adaptation of the boost pressure to the setpoint boost pressure takes place compared to an adaptation of the actual boost pressure to the setpoint boost pressure without taking into account the maximum VTG control criterion. The undesirable enthalpy accumulation described above upstream from the turbine may thus be prevented by a suitable setting of the exhaust gas back pressure. Due to the limiting of the exhaust gas back pressure by determining a suitable maximum VTG control criterion, not only an effective torque optimization but also a uniform limiting of the exhaust gas back pressure is possible, which is used to reduce component variations of exhaust gas turbochargers with respect to their minflow values. The limiting of the exhaust gas back pressure is also used to protect components for components downstream from or within the exhaust manifold.

By taking into account the actual exhaust gas pressure downstream from the turbine during the ascertainment of the maximum exhaust gas back pressure, different operating states of an exhaust gas treatment system (disposed downstream from the turbine), e.g. diesel particle filters, may also be considered. For example, in the case of an increased particle filter loading, an exhaust gas back pressure which is higher than a previous particle filter regeneration may be necessary to achieve/implement the torque increase. The increased particle filter loading may namely influence, in particular increase, a flow resistance to an exhaust gas flow over the turbine.

Moreover, in special operating states of the exhaust gas treatment system, for example particle filter regeneration or desulfurization of an $NO_x$ accumulator-type catalytic converter, the temperature thereof may increase. This, in turn, also results in an increase in the exhaust gas pressure downstream from the turbine (compared to a comparable operating point of the internal combustion engine, in which a special state of the exhaust gas treatment system is not present) and is taken into account by the actual exhaust gas back pressure.

Finally, a position of an exhaust gas flap as well as an aging or sooting of the exhaust gas treatment system and/or a rear muffler may have an influence on the necessary exhaust gas back pressure, which, in turn, is taken into account by the actual exhaust gas pressure downstream from the turbine.

Since the scavenging gradient in the cylinder is also influenced via the exhaust gas back pressure, the residual gas quantity in the cylinder may thus be set. This makes it possible to favorably influence the emissions in diesel engines. In gasoline engines, the combustion conditions may be ensured by limiting the residual gas quantity in the cylinder. In particular, however, a cultivated, smooth and yet rapid torque buildup may nevertheless be implemented. An abrupt torque or torque jumps, which may occur due to a sudden transmission of accumulated exhaust gas enthalpy to the turbine wheel, is/are avoided.

Embodiments exist, which do not form part of the invention, in which the ascertainment of the maximum exhaust gas back pressure furthermore comprises the following: a parameterization of a first maximum exhaust gas back pressure, taking into account an operating state variable (e.g. an engine rotational speed) and an operating state setpoint variable (e.g. the engine setpoint torque) as well as an ambient pressure, parameterization of a second maximum exhaust gas back pressure, taking into account the operating state variable and the difference between the setpoint boost pressure and the actual boost pressure. The maximum exhaust gas back pressure is then defined as the minimum of the first maximum exhaust gas back pressure and the second maximum exhaust gas back pressure. The special consideration in parameterizing the second maximum exhaust gas back pressure is that a boost pressure actual value is added to the particular parameterized value, which was ascertained as a function of the difference between the setpoint boost pressure and the actual boost pressure as well as the operating state variable.

In embodiments relating to the method according to the invention, the ascertainment of the maximum exhaust gas back pressure furthermore comprises the ascertainment of a pressure ratio over the turbine, the following variables being taken into account: a given pressure ratio over the compressor, an ambient temperature and a boost temperature upstream and downstream from the compressor, exhaust gas temperatures upstream and downstream from the turbine and the exhaust gas pressure downstream from the turbine.

Methods exist, in which the ascertainment of the pressure ratio may be determined according to the turbocharger main equation. The turbocharger main equation evaluates the stationary power budget of the compressor and the turbine:

According to [1] Schollmeyer, Beitrag zur modellbasierten Ladedruckregelung for Pkw-Dieselmotoren (Paper on Model-Based Boost Pressure Regulation for Passenger Car Diesel Engines), the following applies to the compressor and turbine power $$P_V = \dot{m}_V \cdot c_{p1} \cdot \frac{1}{\eta_{is,V}} \cdot \left( \left(\frac{p_2}{p_1}\right)^{\frac{\kappa_1-1}{\kappa_1}} - 1 \right)$$

-continued $$P_T = \dot{m}_T \cdot c_{p3} \cdot \frac{1}{\eta_{is,T}} \cdot \left( 1 - \left(\frac{p_4}{p_3}\right)^{\frac{\kappa_3-1}{\kappa_3}} \right)$$

To ascertain the values for specific heat capacity $c_p$ and isentropic exponent κ, models may be used, which supply the values as a function of the gas composition at the turbine and the compressor. Efficiencies $\eta_{is}$ may also be determined via models.

With the aid of the turbocharger main equation, the pressure ratio over the turbine $p_4/p_3$, may be ascertained for a given pressure ration over the compressor $p_2/p_1$ (which is formed from the setpoint boost pressure over the actual pressure downstream and upstream from the compressor), a given setpoint mass flow of the compressor and the prevailing actual temperatures upstream and downstream from the compressor and the turbine.

According to an evaluation of the pressure ratio over the turbine $p_4/p_3$ and an inversion thereof, the maximum exhaust gas back pressure may be ascertained, taking into account the ascertained actual exhaust gas pressure. In other words, the maximum exhaust gas back pressure upstream from the turbine may be ascertained according to the following relationship:

$$p_{3max} = \frac{1}{\frac{p_4}{p_3}} \cdot p_4$$

By determining the pressure ratio over the turbine with the aid of the turbine main equation and the subsequent inversion of the pressure ratio, the maximum exhaust gas back pressure may be reliably determined if the exhaust gas pressure downstream from the turbine is known (for example, by means of modeling or sensor detection).

In addition embodiments, the ascertainment of the maximum exhaust gas back pressure comprises a parameterization of a difference between a pressure difference over the compressor and a pressure difference over the turbine, taking an operating state variable into account. This parameterized difference is expressed by the following relationship:

$$p_{off,n} = (p_3 - p_{4ist}) - (p_{2soll} - p_{1ist})$$

In other words, a previously determined difference (offset) of the pressure differences, in particular of pressure drops, over the compressor or over the turbine as a function of an operating state variable (of the internal combustion engine), e.g. the actual engine rotational speed, may be applied (to the supercharging system). The offset may be ascertained, for example by means of test series, and be stored in a characteristic map provided for this purpose. During the test series, exhaust gas back pressure $p_3$ may be detected by a sensor and determined by a model.

At a given exhaust gas pressure downstream from the turbine and the ascertained, previously determined difference of the pressure differences over the compressor and over the turbine, the maximum exhaust gas back pressure may be ascertained according to the following relationship:

$$p_{3max} = p_{2soll} - p_{1ist} + p_{4ist} + p_{off,n}$$

The maximum exhaust gas back pressure may be reliably and, in particular, particularly easily ascertained in this way. By selecting a pressure difference (offset) over the compressor and over the turbine, the maximum exhaust gas back pressure may furthermore be determined in such a way that the maximum exhaust gas back pressure meets efficiency and performance requirements (e.g. avoiding unnecessary charge cycles), while the variable conditions around the supercharging system or supercharging state are preferably narrowly described, so that influencing factors, such as ambient pressure and exhaust gas pressure downstream from the turbine may be compensated for. In the above equation, an influence of the ambient pressure is, in particular, at least largely eliminated in the above equation by selecting the pressure difference or by the offset, and the exhaust gas pressure downstream from the turbine is used directly to determine the maximum exhaust gas back pressure.

Alternatively to using the pressure differences described above for determining the offset, pressure ratios over the compressor and the turbine may also be taken into account:

$$\text{Offset}(n_{M-ist}) = \prod_T - \prod_V$$

$$\prod_V = \frac{p_{2soll}}{p_{1ist}}$$

$$\prod_T = \frac{p_3}{p_{4ist}}$$

In this case, the offset has the same dependencies as the determination of the offset using the pressure differences over the compressor and over the turbine. Once again, the offset may be ascertained, for example by means of test series, and be stored in a characteristic map provided for this purpose.

At a given exhaust gas pressure downstream from the turbine and the ascertained, previously determined pressure ratio over the compressor, the maximum exhaust gas back pressure may be ascertained according to the following relationship:

$$p_{3max} = (\prod_V + \text{Offset}(n_{M-ist})) \cdot p_{4ist}$$

The aforementioned influencing factors may also be well compensated for by this relationship.

Methods exist, in which the actual boost pressure and/or the actual exhaust gas back pressure and/or the actual exhaust gas pressure is/are determined with the aid of a sensor, or alternatively is a modeled value, which may be modeled or calculated from the particular operating state variables and stored in suitable characteristic maps.

In a method, which is not part of the invention, in which the parameterization of the second maximum exhaust gas back pressure occurs by taking into account a scavenging gradient, a reliable scavenging gradient may also be maintained when setting the maximum exhaust gas back pressure. In addition, the scavenging gradient may be determined with the aid of a characteristic map. This permits a particularly easy operating state-dependent determination of the scavenging gradient.

Due to a method, in which the VTG control criterion is determined taking into account a maximum exhaust gas back pressure change, the setting quality, in particular the control quality, may be further improved. The setting speed of the exhaust gas pressure to be set is also taken into account thereby, so that its adaptation may be optimized.

In a method, in which the maximum exhaust gas back pressure change is determined from a parameterization of the operating state variable, in particular a rotational speed, and the operating state setpoint variable, in particular a setpoint torque or load state, and it may then be weighted according to the difference between the actual exhaust gas back pressure and the maximum exhaust gas back pressure, the method may be further refined.

Another refinement is implemented in that, to determine the maximum exhaust gas back pressure change, a correction factor is taken into account, which is parameterized from the difference between the actual exhaust gas back pressure and the maximum exhaust gas back pressure (e.g. via a characteristic map, a modeling or a calculation specification).

The setting, which may take place, in particular, via a proportional controller (P controller), may thus be equipped with a so-called gain scheduling. This facilitates a parameterization, in which the amplification and the associated adjustment speed of the closed control loop is set as a function of the engine setpoint torque (operating state setpoint variable) and the rotational speed (operating state variable). A weighting takes place using the corresponding control deviation (the difference between the maximum permissible exhaust gas back pressure and the actual exhaust gas back pressure). This method is also referred to as "gain scheduling."

A reliable ascertainment of the VTG control criterion occurs, taking the relationship into account:

$$u_{max} = \Delta u_{p3Cd\,max} + \Delta u_{p4} + \Delta u_T + \Delta u_{\dot{m}} + r_{Vtg}$$

for which, the following applies:

$$\Delta u_{p3Cd\,max} = \alpha \cdot \dot{p}3_{max} = \alpha \cdot K_p \cdot (p_{3max} - p_3)$$

$$\Delta u_{p4} = -\alpha \cdot \frac{\partial p_3}{\partial p_4} \cdot \dot{p}_4$$

$$\Delta u_T = -\alpha \cdot \frac{\partial p_3}{\partial T_3} \cdot \dot{T}_3$$

$$\Delta u_{\dot{m}} = -\alpha \cdot \frac{\partial p_3}{\partial \dot{m}} \ddot{m}$$

where:

$$\alpha = \frac{\tau}{\left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right)}$$

This makes it possible to implement an input/output linearization, which permits the VTG control criterion to be determined from the maximum permissible time change of the exhaust gas back pressure, with the aid of returned state variables (such as temperatures $T_1$, $T_2$ upstream and downstream from the supercharger (compressor); temperatures $T_3$, $T_4$ upstream and downstream from the turbine; actual pressures $p_3$, $p_4$ upstream and downstream from the turbine; the actual VTG position) of the controlled system.

The calculation conditions indicated above are derived as follows:

To derive the control law, the throttle equation (equation 1) is used to describe exhaust gas back pressure $p_3$ according to [1], and the method of input/output linearization (I/O linearization) is applied according to [2] Isidori, Nonlinear Control Systems, 1995.

$$p_3 = -\frac{(6c_d^2 - 2c_{dK})p_4}{2(2c_{dK} - 3c_d^2)} \pm \sqrt{\left(\frac{(6c_d^2 - 2c_{dK})p_4}{2(2c_{dK} - 3c_d^2)}\right)^2 + \frac{3c_d^2 p_4^2 A_{eff}^2 + \dot{m}^2 R_s \cdot T_{3K}}{A_{eff}^2 (2c_{dK} - 3c_d^2)}} \quad (1)$$

Exhaust gas back pressure $p_3$ is dependent on the variables of flow factor $c_d$, effective area $A_{eff}$, temperature upstream from the turbine $T_3$, turbine mass flow $\dot{m}$ and pressure downstream from the turbine $p_4$, which, in turn, depend on time and are present in the control unit as model or sensor variables. The case distinction of the root term takes place according to [1], based on criterion $\xi = 2c_{dK} - 3c_d^2$. If $\xi$ takes on positive values, the root term is added; if it takes on negative ones, the root term is subtracted.

Variables $A_{eff}$ and $c_d$ each depend nonlinearly on actuator position $r_{Vtg}$, so that it is not formally possible to reach an actuator position at an exhaust gas back pressure without applying a search or optimization method. This problem may be solved by applying the I/O linearization.

As specified by the scheme of the I/O linearization, this equation is now derived for $p_3$ according to time until manipulated variable $r_{Vtg}$ (VTG position) occurs in an input-affine manner.

For this purpose, the (position-controlled) actuator behavior of the variable turbine geometry (VTG) is additionally modeled as the PT1 behavior according to equation 2

$$\tau \cdot \dot{r} = u - r_{Vtg} \tag{2}$$

Variable u is the sought actuator position of the VTG.

Equation 3, which includes change in manipulated variable over time $\dot{r}$, results for the first time derivation of exhaust gas back pressure $\dot{p}_3$.

$$\dot{p}_3 = \left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right) \cdot \dot{r} + \frac{\partial p_3}{\partial p_4} \cdot \dot{p}_4 + \frac{\partial p_3}{\partial T_3} \cdot \dot{T}_3 + \frac{\partial p_3}{\partial \dot{m}} \ddot{m} \tag{3}$$

$\dot{r}$ from equation 2 may now be used in equation 3, so that equation 4 results. It is apparent that a necessary actuator position may be assigned to a time change of the exhaust gas back pressure. Within the scope of the limiting regulation, these variables are to be interpreted as a permissible maximum change in the exhaust gas back pressure, to which a permissible maximum setpoint VTG position corresponds.

$$\dot{p}_3 = \left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right) \cdot \frac{1}{\tau}\left(u - r_{Vtg} + \frac{\partial p_3}{\partial p_4}\right) \cdot \dot{p}_4 + \frac{\partial p_3}{\partial T_3} \cdot \dot{T}_3 + \frac{\partial p_3}{\partial \dot{m}} \ddot{m} \tag{4}$$

It is clear that sought manipulated variable u occurs linearly in the first derivation of $p_3$; the differential order is $\delta=1$, and it is not necessary to form additional time derivations of the $p_3$ state equation. Due to the differentiations, the control components of $c_d$ and $A_{eff}$ may be added up to a common, effective control component.

If the partial derivations are present, necessary, (maximum in this case) manipulated variable u may be ascertained from equation 4 for a (maximum permissible in this case) exhaust gas back pressure change $\dot{p}_3$ with the aid of a simple term transformation, which results in equation 5. As described above, $\dot{p}_3$ corresponds to the output variable of the higher-level P controller, so that the following results as the control law:

$$u = \frac{\tau}{\left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right)} \tag{5}$$

-continued $$\left(\dot{p}_3 - \frac{\partial p_3}{\partial p_4} \cdot \dot{p}_4 - \frac{\partial p_3}{\partial T_3} \cdot \dot{T}_3 - \frac{\partial p_3}{\partial \dot{m}} \ddot{m}\right) + r_{Vtg}$$

If this equation is interpreted according to the present goal of the limiting regulation, the relevant variables $\dot{p}_3$ and u are provided with max indices. In addition, a position change component $\Delta u$ may be defined as a deviation from actual position $r_{Vtg}$ by multiplying out each state derivation, whereby interference components and their influence on position changes may identified more transparently than in classic regulation approaches. The compact representation from equation 6 thus results.

$$u_{max} = \Delta u_{p3Ctl\,max} + \Delta u_{p4} + \Delta u_T + \Delta u_{\dot{m}} + r_{Vtg} \tag{6}$$

The assignment of the $\Delta u$ variables according to equation set 7 follows, while simultaneously using a proportional controller (including its amplification $K_p$) in the feedback of actual exhaust gas back pressure $p_3$.

$$\Delta u_{p3Ctl\,max} = \alpha \cdot \dot{p}_{3max} = \alpha \cdot K_p \cdot (p_{3max} - p_3) \tag{7}$$

$$\Delta u_{p4} = -\alpha \cdot \frac{\partial p_3}{\partial p_4} \cdot \dot{p}_4$$

$$\Delta u_T = -\alpha \cdot \frac{\partial p_3}{\partial T_3} \cdot \dot{T}_3$$

$$\Delta u_{\dot{m}} = -\alpha \cdot \frac{\partial p_3}{\partial \dot{m}} \ddot{m}$$

where:

$$\alpha = \frac{\tau}{\left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right)}$$

Finally, the control loop is closed by deploying the P controller to form the maximum permissible exhaust gas back pressure change. The time derivations of the other state variables may take place either via an approximate calculation with the aid of difference quotients and their filtering or by using DT1 elements with first-order lag, or by calculating first-order state differential equations in each time step within the scope of a state observer. The use of DT1 elements with first-order lag, which are supplied from the state variables present in the control unit, has proven in the present application to be practical and adequate for approximating the time derivations of the state variables.

For the purpose of completeness, the partial derivations are illustrated below, which are calculated in each time step from the time-variant state variables present in the control unit.

Partial derivation of the stationary $p_3$ equation

Stationary state equation of the exhaust gas back pressure $$p_3 = -\frac{(6c_d^2 - 2c_{dK})p_4}{2(2c_{dK} - 3c_d^2)} \pm \sqrt{\left(\frac{(6c_d^2 - 2c_{dK})p_4}{2(2c_{dK} - 3c_d^2)}\right)^2 + \frac{3c_d^2 p_4^2 A_{eff}^2 + \dot{m}^2 R_s \cdot T_{3K}}{A_{eff}^2 (2c_{dK} - 3c_d^2)}}$$

Partial Derivations

Whether the positive or negative root term is to be selected depends on term $\xi := 2c_{dK} - 3c_d^2$. If $\xi$ is positive, the root term is added; if $\xi$ is negative, the root term is subtracted. Accordingly, a case distinction is carried out in each case below.

Partial derivation according to $r_{Vtg}$ $$\frac{\partial p_3}{\partial r_{Vtg}} = \frac{\partial p_3}{\partial A_{eff}} \cdot \frac{\partial A_{eff}}{\partial r_{Vtg}} + \frac{\partial p_3}{\partial c_d} \cdot \frac{\partial c_d}{\partial r_{Vtg}} \quad \frac{[hPa]}{[\%]}$$

$$\frac{\partial p_3}{\partial A_{eff}} = \pm \frac{3\dfrac{c_d^2 p_4^2}{A_{eff}(2c_{dK} - 3c_d^2)} - \dfrac{3c_d^2 p_4^2 A_{eff}^2 + \dot{m}^2 R_s \cdot T_{3K}}{A_{eff}^3(2c_{dK} - 3c_d^2)}}{\sqrt{\dfrac{(6c_d^2 - 2c_{dK})^2 p_4^2}{(4c_{dK} - 6c_d^2)} + \dfrac{3c_d^2 p_4^2 A_{eff}^2 + \dot{m}^2 R_s T_{3K}}{A_{eff}^3(2c_{dK} - 3c_d^2)}}}$$

$$\frac{\partial p_3}{\partial c_d} = \frac{(-12c_d + 2_K)p_4}{(4c_{dK} - 6c_d^2)} - \frac{(-6c_d^2 + 2c_{dK})p_4(4K - 12c_d)}{(4c_{dK} - 6c_d^2)^2} \pm \ldots$$

$$\ldots \pm \frac{\left(2\dfrac{(6c_d^2 - 2c_{dK})p_4^2(12c_d - 2_K)}{(4c_{dK} - 6c_d^2)^2} - 2\dfrac{(6c_d^2 - 2c_{dK})^2 p_4^2(4_K - 12c_d)}{(4c_{dK} - 6c_d^2)^3} + \dfrac{6c_d p_4^2}{2c_{dK} - 3c_d^2} - \dfrac{(3c_d^2 p_4^2 A_{eff}^2 + \dot{m}R_S T_{3K})(2_K - 6c_d)}{A_{eff}^2(2c_{dK} - 3c_d^2)^2}\right)}{2 \cdot \sqrt{\dfrac{(6c_d^2 - 2c_{dK})^2 p_4^2}{(4c_{dK} - 6c_d^2)^2} + \dfrac{3c_d^2 p_4^2 A_{eff}^2 + \dot{m}^2 R_S T_{3K}}{A_{eff}^2(2c_{dK} - 3c_d^2)}}}$$

Partial deviation according to $p_4$ $$\frac{\partial p_3}{\partial p_4} = \frac{-6c_d^2 + 2c_{dK}}{4c_{dK} - 6c_d^2} \pm \frac{\left(\dfrac{(6c_d^2 - 2c_{dK})^2 p_4}{(4c_{dK} - 6c_d^2)^2} + 3\dfrac{c_d^2 p_4}{2c_{dK} - 3c_d^2}\right)}{\sqrt{\dfrac{(6c_d^2 - 2c_{dK})^2 p_4^2}{(4c_{dK} - 6c_d^2)^2} + \dfrac{3c_d^2 p_4^2 A_{eff}^2 + \dot{m}R_S T_{3K}}{A_{eff}^2(2c_{dK} - 3c_d^2)}}}$$

Partial deviation according to $T_3$ $$\frac{\partial p_3}{\partial T_3} = \pm \frac{\dot{m}^2 R_{sK}}{2 \cdot \sqrt{\dfrac{(6c_d^2 - 2c_{dK})^2 p_4^2}{(4c_{dK} - 6c_d^2)^2} + \dfrac{3c_d^2 p_4^2 A_{eff}^2 + \dot{m}R_S T_{3K}}{A_{eff}^2(2c_{dK} - 3c_d^2)}} \, A_{eff}^2(2c_{dK} - 3c_d^2)}$$

Partial deviation according to $\dot{m}$ $$\frac{\partial p_3}{\partial \dot{m}} = \pm \frac{\dot{m} R_S T_{3K}}{2 \cdot \sqrt{\dfrac{(6c_d^2 - 2c_{dK})^2 p_4^2}{(4c_{dK} - 6c_d^2)^2} + \dfrac{3c_d^2 p_4^2 A_{eff}^2 + \dot{m}R_S T_{3K}}{A_{eff}^2(2c_{dK} - 3c_d^2)}} \, A_{eff}^2(2c_{dK} - 3c_d^2)}$$

In a method, in which the operating state variable is an engine rotational speed and the operating setpoint variable is an engine setpoint torque, the desired setting/regulations may be carried out using particularly easily ascertainable or derivable state variables.

In a method, in which the exhaust gas back pressure is determined by means of a regulation-implemented input/output linearization, the, in particular following, variables (such as temperatures $T_4$ downstream from the turbine; actual pressure $p_3$ upstream from the turbine; exhaust gas mass flow $\dot{m}$) are taken into account (at which these variables may be fed back), exogenous influencing variables may be taken into account in model components of the regulations, and faults may be compensated for by changing ambient conditions such as ambient temperature and ambient pressure.

The application complexity may be reduced thereby compared to other approaches. The nonlinearity of the turbine-side throttle may furthermore be nominally compensated for, so that the parameterization may be implemented with the aid of a simple P controller. The nonlinearity of the controlled system is compensated for by means of this linearization part or linearization method.

For the linearization, the state equations of the change in exhaust gas back pressure over time up to reaching the relative degree or the manipulated variable is derived as illustrated above, so that a model inverse may be formed, in which the VTG control criterion (the maximum permission VTG position) is ascertained as a function of a maximum permissible change in the exhaust gas back pressure. In connection with a linear P controller, which calculates or evaluates the control deviation between the parameterizable maximum exhaust gas back pressure and an actual model of measured value of the exhaust gas back pressure and thus outputs the maximum permissible change in the exhaust gas back pressure for each time step, a linear first-order delay behavior results for the limited case with a constant parameterization of the P controller.

The maximum exhaust gas back pressure can be increased by an offset, which is dependent on a boost pressure control deviation. Boost pressure control deviation is understood to be a difference, in particular its absolute value, between the setpoint and actual boost pressure. The dependency may be expressed in that the smaller the boost pressure control deviation, the greater the offset. The increase may take place, for example, linearly or in stages.

The dependency of the offset on the boost pressure control deviation has the effect that an abrupt change in the maximum permission exhaust gas back pressure is avoidable. In other words, a poor driving behavior due to an abrupt change in an effective torque generated by the internal combustion engine may be prevented by increasing the offset as a function of the boost pressure control deviation.

In particular, if the actual boost pressure (essentially) corresponds to the setpoint boost pressure, the offset may be selected in such a way that the VTG control criterion no longer limits the VTG setpoint position. This is achievable, for example, by an infinitely high setting of the offset. In practical terms, the offset is set to a value for implementing a component protection, for example for the turbine, VTG actuator and/or waste gate. In other words, a value is set for a maximum offset, in which the aforementioned components are protected against excessively high pressure.

As described above, the offset may also be selected in such a way that an undesirable intervention of the VTG driving circuit due to an excessively limited maximum exhaust gas back pressure is preventable. After all, this limiting is sensible only during a dynamic operation of the internal combustion engine, e.g. during boost pressure buildup. The boost pressure control deviation described above may be used to be able to bring about a separation between dynamic and stationary operation. An unnecessary limiting of the VTG driving action is avoided at an adjusted boost pressure, i.e. if the setpoint boost pressure (at least essentially) corresponds to the actual boost pressure.

Some exemplary embodiments relate to a control system for a supercharging system for an internal combustion engine, the control system being configured to carry out the method described above. The control system may include a processor and a memory, in which the method and corresponding characteristics, characteristic maps, models, computing programs and the like are stored. The control system may be designed, for example, as an engine control unit.

Some exemplary embodiments relate to an internal combustion engine, which includes a supercharging system and a control system, as described above.

Some exemplary embodiments also relate to a motor vehicle, which includes an internal combustion engine of this type.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
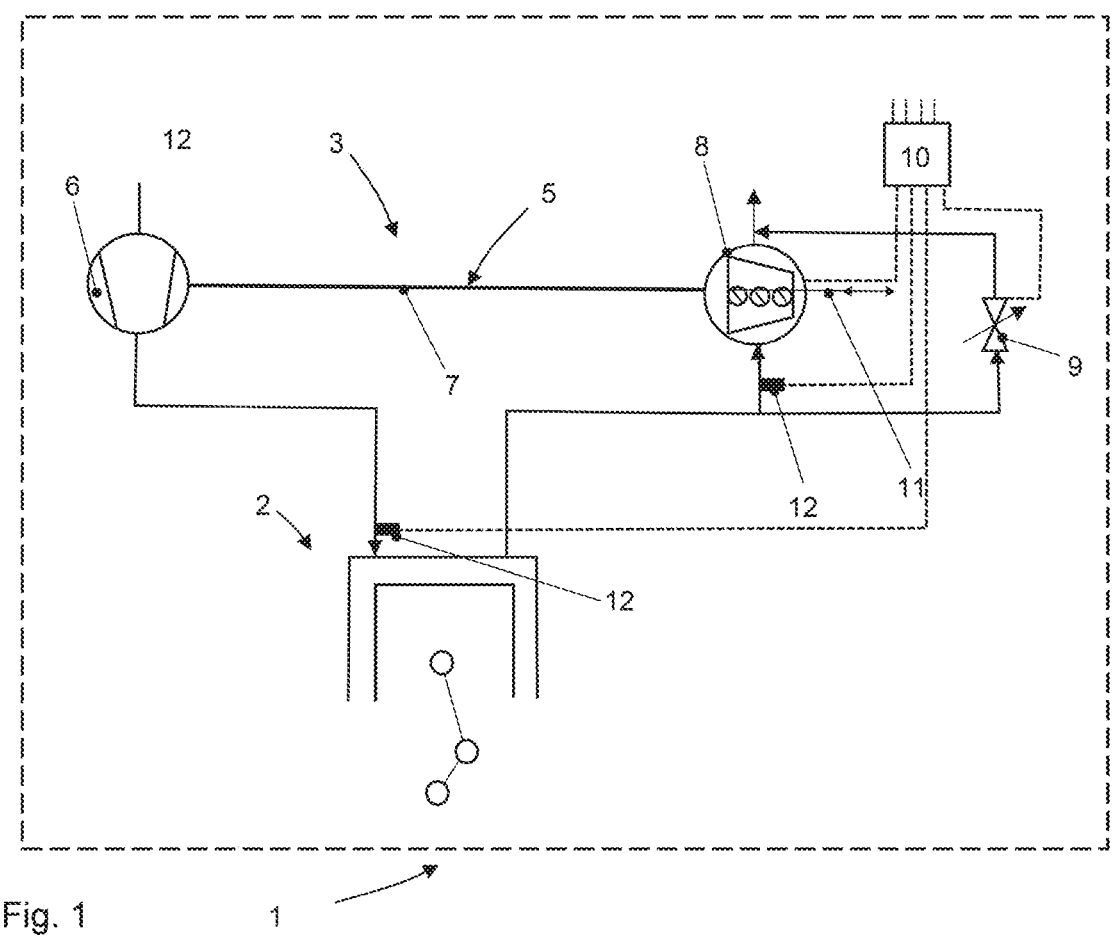
FIG. 1 schematically shows an exemplary embodiment of a motor vehicle, which includes a supercharging system and a control system.

An exemplary embodiment of a motor vehicle 1, which includes an engine 2 and a supercharging system 3, which is controlled by a control system 10, which is designed as an engine control unit, is illustrated in FIG. 1.

The present invention is not limited to a specific engine type. It may be an internal combustion engine which is designed as a gasoline engine or as a diesel engine.

Engine 2 comprises one or multiple cylinders 4, one of which is illustrated here. Cylinders 4 are supplied with supercharged (combustion) air by supercharging system 3.

Supercharging system 3 includes a supercharging stage having a variable turbine geometry. Supercharging stage 5 is coupled with control system 10.

Supercharging stage 5 includes a compressor 6, which is operated via a shaft 7 with a turbine (exhaust gas turbine) 8 having a variable turbine geometry (VTG), turbine 8 being supplied with exhaust gas from engine 2 and being driven thereby. In addition, a waste gate 9 is optionally provided. A generating set which is supercharged in multiple stages may also be optionally provided.

During operation, ambient air is conducted through compressor 6 at ambient pressure $p_1$ and ambient temperature $T_1$, compressed and conducted into cylinder 4 at boost pressure $p_2$ and boost temperature $T_2$. The exhaust gases are conducted to the turbine at exhaust gas back pressure $p_3$ and exhaust gas temperature $T_3$, where they emerge at downstream turbine temperature $T_4$ and downstream turbine pressure (exhaust gas pressure) $p_4$. The controller is connected to waste gate 9 and a mechanism 11 for setting the variable turbine geometry as well as optionally to a sensor 12, with the aid of which exhaust gas temperature $T_3$ or exhaust gas back pressure $p_3$ may be measured. Another sensor 12 is optionally provided, with the aid of which boost pressure $p_2$ and air temperature $T_2$ downstream from compressor 6 may be measured. The control system is equipped with additional sensor inputs and signal outputs for receiving and processing operating state variables and outputting actuating and control signals. These include, for example, the aforementioned temperature and pressure values, which are either ascertained or modeled via sensors or via operating state variables or may be determined via characteristic maps.

Figure 2:
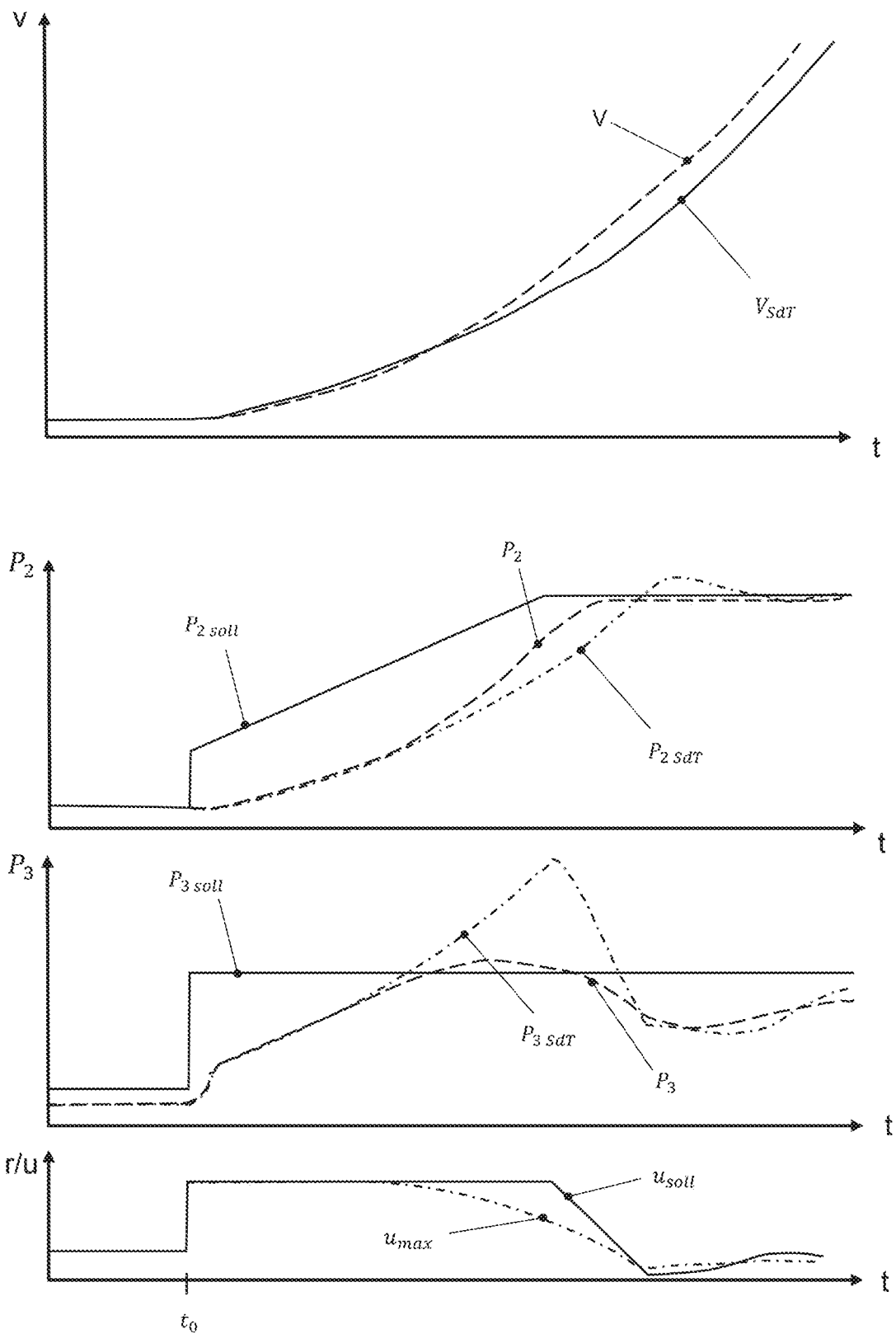
FIG. 2 shows progression diagrams illustrated velocity progressions, boost pressure progressions, back pressure progressions and position progressions of the exhaust gas turbine geometry over time and the difference between the method according to the invention and conventional methods.

FIG. 2 shows multiple diagrams, one above the other, in which certain control and state variables are plotted over time.

Vehicle velocity v is plotted over time in the upper diagram. The solid line marks a velocity progression $V_{SdT}$ without using the method according to the invention, and the dashed line shows velocity progression v for a vehicle, in which the method according to the invention was applied.

The vehicle velocity and the acceleration are dependent on boost pressure progression $p_2$ situated thereunder. For example, by actuating the gas pedal, an acceleration request (e.g. full load request) is transmitted at a point in time $t_0$ to control system 10, which subsequently determines a setpoint boost pressure (solid line) or a setpoint boost pressure progression $p_{2soll}$, which results in the desired boost pressure increase and thus in the desired acceleration. The dash-dotted line shows a boost pressure progression, which results during a conventional boost pressure regulation. ($p_{2SdT}$). The dashed line shows a boost pressure progression $p_{2'}$, which results during an application of the method according to the invention. This progression is closer to the progression of setpoint boost pressure $p_{2soll}$, and therefore also results in the improved acceleration or the increased velocity in the diagram thereabove.

The progression of exhaust gas back pressure $p_3$ is plotted over time in the diagram thereunder. The solid ramp curve shows the progression of the theoretical, maximum exhaust gas back pressure $p_{3soll}$, which is to be set to make an optimum setting of the boost pressure and thus the acceleration. The dash-dotted line shows the actual progression of exhaust gas back pressure $p_{3SdT}$ without applying the method according to the invention. The dashed line shows the progression of actual exhaust gas back pressure $p_3$ when applying the method according to the invention, which sets an exhaust gas back pressure limitation, which adjusts the actual exhaust gas back pressure close to setpoint exhaust gas back pressure $p_{soll}$. In this diagram, an "enthalpy accumulation" is apparent in the area of the conventional exhaust gas back pressure progression and the exhaust gas back pressure progression according to the invention, which results in that the buildup of the desired boost pressure is delayed by the unused enthalpy and exceeds the setpoint boost pressure.

Position r of the turbocharger geometry is set in the lower diagram. The solid line marks progression $u_{soll}$ of the adjustable turbine geometry without taking into account an exhaust gas back pressure limitation. The dashed progression is ascertained by taking into account an exhaust gas back pressure limitation and represents the progression of control criterion $u_{max}$, according to the invention of the adjustable turbocharger geometry. However, the latter runs below the progression of setpoint position $u_{soll}$ and thus prevents the overshooting exhaust gas back pressure progression in the diagram thereabove.

The method according to the invention is further explained based on FIGS. 2, 3 through 5.

Figure 3:
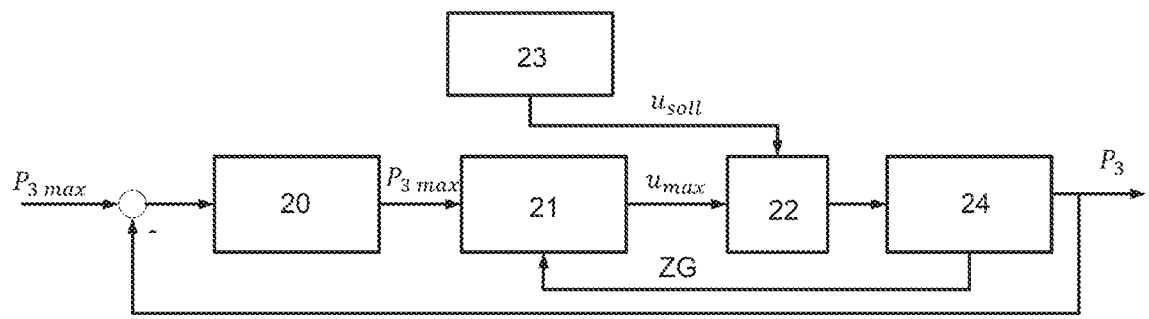
FIG. 3 shows a schematic representation of an exhaust gas back pressure limiting regulating circuit according to the invention.

A control loop is illustrated in FIG. 3, which adjusts an actual exhaust gas back pressure $p_3$, taking into account a maximum exhaust gas back pressure $p_{3max}$ (cf. below), which implements an optimized boost pressure $p_2$. The difference from maximum exhaust gas back pressure $p_{3max}$ and exhaust gas back pressure $p_3$ is supplied to a controller 20 (P controller), which forwards a maximum exhaust gas back pressure change $\dot{p}_{3max}$ to a linearization block 21. Taking into account additional state variables ZG (such as temperature $T_3$ upstream from the turbine, actual pressures $p_3$, $p_4$, upstream and downstream from the turbine as well as exhaust gas (turbine) mass flow $\dot{m}$), the linearization part determines a maximum VTG control criterion $u_{max}$, which is conducted to a limitation part 22. In limitation part 22, VTG control criterion $u_{max}$ is compared with a regular VTG position $u_{soll}$, which is supplied from a conventional boost pressure regulation part 23. VTG control criterion $u_{max}$ limits VTG setpoint position $u_{soll}$ in such a way that exhaust gas back pressure $p_3$ is adjusted close to desired setpoint exhaust gas back pressure $p_{3soll}$ via the adjustable turbine geometry or adjusting mechanism 11 (VTG) and/or possibly also via waste gate 9.

Mechanism 11 of the adjustable turbine geometry, which is addressable via control system 10, corresponds to controlled system 24 in FIG. 2.

Figure 4:
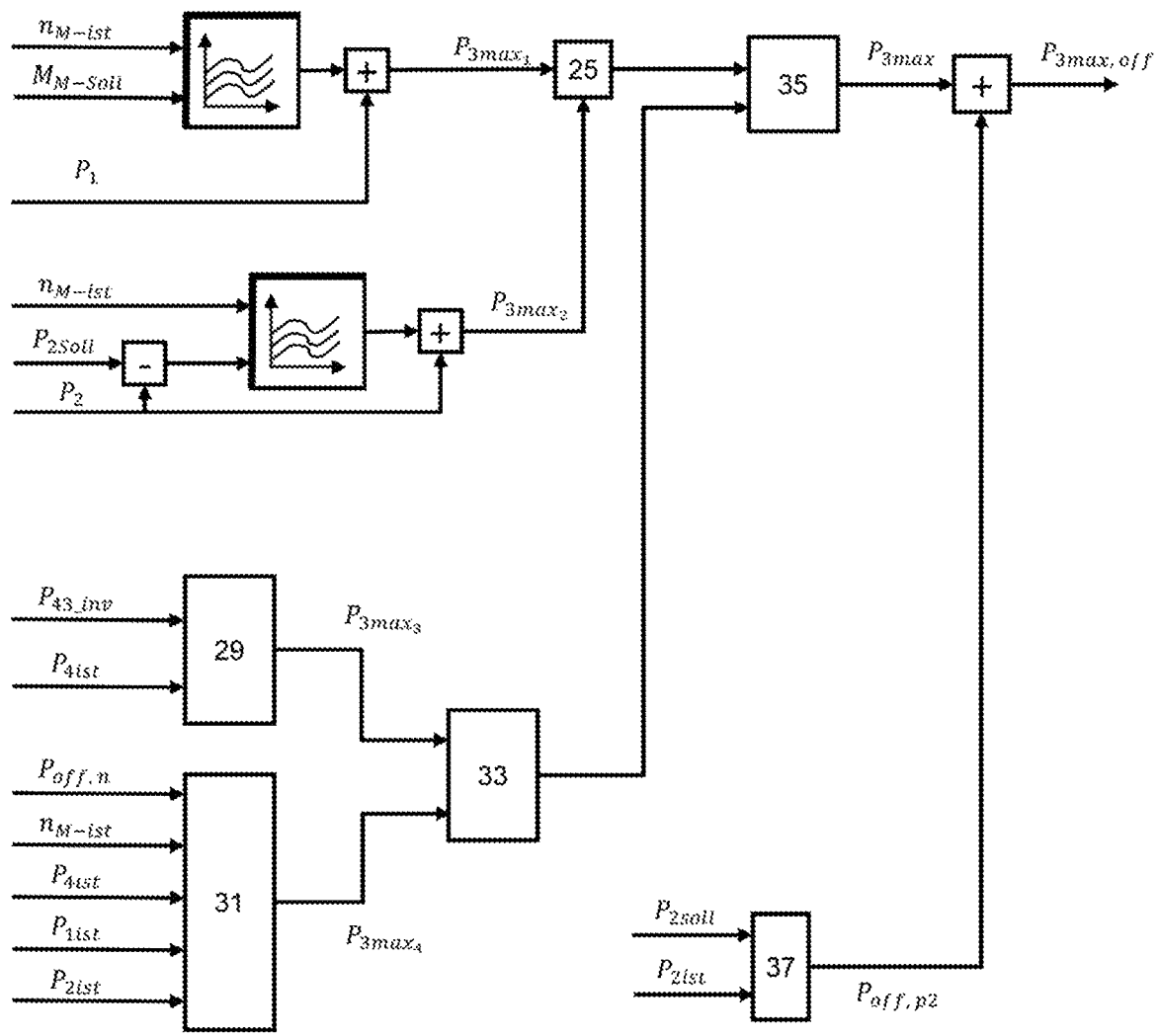
FIG. 4 shows a schematic representation for ascertaining a maximum permissible exhaust gas back pressure according to the method according to the invention.

FIG. 4 schematically shows the determination of maximum permissible exhaust gas back pressure $p_{3max}$. In particular, four branches are apparent, which represent the determination of maximum permissible exhaust gas back pressure values $p_{3max1}$ through $p_{3max4}$, the two first branches for $p_{3max1}$ and $p_{3max2}$ not forming part of the present invention, the last two branches for $p_{3max3}$ and $p_{3max4}$, however, forming part thereof. However, the first and second branches may be added to the present invention.

In the upper (first) branch, a pressure variable is parameterized from engine rotational speed n and a setpoint engine torque $M_{m\text{-}soll}$ (with the aid of a characteristic map or another modeling or calculation method), to which ambient pressure $p_1$ is added. The pressure variable and added ambient pressure $p_1$ result in first maximum exhaust gas back pressure $p_{3max1}$. In the lower (second) branch, a second maximum exhaust gas back pressure $p_{3max2}$ is parameterized, taking into account the difference from boost pressure $p_2$ and setpoint boost pressure $p_{2soll}$ as well as engine rotational seed n (also via a characteristic map or another suitable modeling or calculation). The desired maximum exhaust gas back pressure $p_{3max}$ results from the minimum of the two variables of first maximum exhaust gas back pressure $p_{3max1}$ and second maximum exhaust gas back pressure $p_{3max2}$, which are selected in block 25. In the case of the pressure variable parameterized in the lower (second) branch, the permissible maximum pressure difference (scavenging gradient) between exhaust gas back pressure $p_3$ and boost pressure $p_2$ is taken into account in each case. This ensures that the subsequent exhaust gas back pressure limiting regulation according to FIG. 2 also observes the compliance with the set permissible scavenging gradient.

Desired maximum exhaust gas back pressure $p_{3max}$ may also be ascertained, as described below.

In the third branch, maximum exhaust gas back pressure $p_{3max3}$ is ascertained, taking into account an inverse $p_{43\_inv}$ of the pressure ratio over turbine 8 and an actual exhaust gas pressure $p_{4ist}$ downstream from turbine 8 and ascertained (by means of sensor detection or modeling). For this purpose, inverse $p_{43\_inv}$ is multiplied by actual exhaust gas pressure $p_{4ist}$ in block 29.

In addition, a maximum exhaust gas back pressure $p_{3max4}$ is ascertained in the fourth branch, in that a rotational speed-dependent offset $p_{off,n}$ between a pressure difference over compressor 6 and a pressure difference over turbine 8 is to be applied. Accordingly, actual exhaust gas pressure $p_{4ist}$ downstream from turbine 8, actual pressures $p_1$, $p_2$ upstream and downstream from compressor 6 and offset $p_{off,n}$ applied/to be applied are given or to be ascertained for this purpose.

The selection between $p_{3max3}$ and $p_{3max4}$ as desired maximum exhaust gas back pressure $p_{3max}$ takes place in block 33. The selection is an applicative degree of freedom. In other words, no decision logic is used for the selection, but rather a (function) user/applier decides which ascertainment approach he prefers or would like to select. This applicative decision is also carried out in block 35, i.e. the (function) user/applier decides whether the exhaust gas back pressure ascertained in block 25 or block 33 is used as desired maximum exhaust gas back pressure $p_{3max}$. An optional ascertainment by the (function) user/applier is thus carried out in blocks 33 and 35.

It is clear that a decision/selection may be alternatively made in block 33 and/or block 35 as a function of determined temperature and/or pressure conditions upstream and downstream from compressor 6 and/or turbine 8.

In addition, ascertained maximum exhaust gas back pressure $p_{3max}$ may be further increased by an offset $p_{off,p2}$. For this purpose, offset $p_{off,p2}$ is determined in block 37 as a function of the boost pressure control deviation. A continuous increase of ascertained maximum exhaust gas back pressure $p_{3max}$ by offset $p_{off,p2}$ thus takes place.

In the case of a great boost pressure control deviation, offset $p_{off,p2}$ is equal to 0. The closer the boost pressure control deviation approaches the value 0, the greater the offset $p_{off,p2}$. At a boost pressure control deviation of essentially 0, offset $p_{off,p2}$ is preferably so large that maximum exhaust gas back pressure $p_{3max,off}$ increased by offset $p_{off,p2}$ is below a maximum component stress limit of turbine 8, the VTG actuator and/or waste gate 9.

Figure 5:
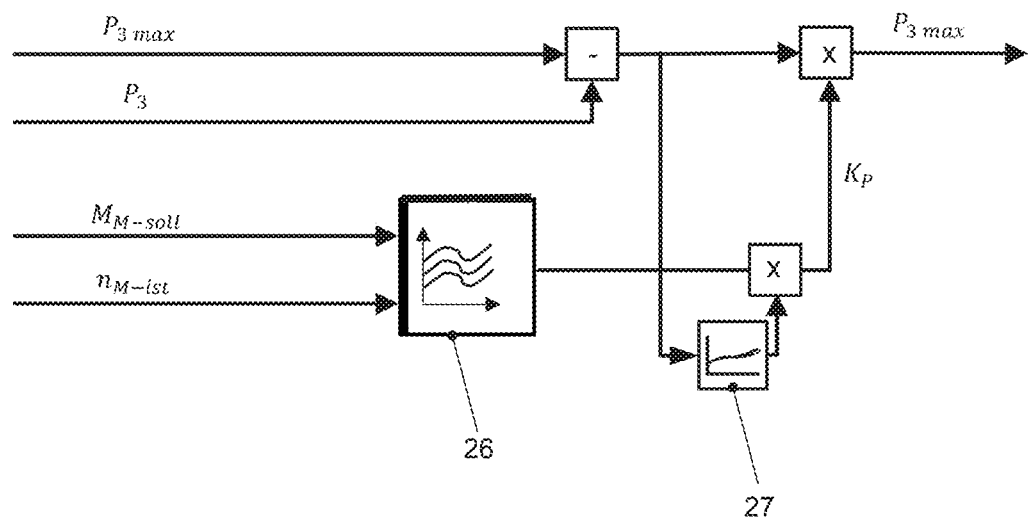
FIG. 5 shows a schematic representation of the regulating circuit, taking into account a gain scheduling approach.

FIG. 5 shows a function element of controller 20 illustrated in FIG. 2, which is designed as a proportional controller (P controller). FIG. 4 shows a so-called "gain scheduling" chip, which outputs a maximum permissible change in the exhaust gas back pressure ($\dot{p}_{3max}$) over time. For this purpose, the difference between maximum permissible exhaust gas back pressure $p_{3max}$ and exhaust gas back pressure $p_3$ (actual exhaust gas back pressure) is taken into account, and EP component 26 parameterizes a value from engine setpoint torque $M_{m\text{-}soll}$ as well as engine torque $N_{M\text{-}ist}$, which is multiplied by a correction value ascertained in a control deviation correction block 27. The control deviation correction is parameterized from the difference between maximum permissible back pressure $p_{3max}$ and back pressure $p_3$ and results in a control amplification $K_p$, which results in a maximum permissible change in exhaust gas back pressure $p_{3max}$ with the difference between maximum permissible exhaust gas back pressure $p_{3max}$ and actual exhaust gas back pressure $p_3$. The VTG control criterion $u_{max}$ is then ascertained from this maximum permissible time change in exhaust gas back pressure $\dot{p}_{3max}$ in linearization part 21. This linearization takes place according to the aforementioned mathematical methodology.

Alternatively to the embodiment illustrated above, methods are also possible, in which the limitation of the VTG control criterion or the VTG position is adjusted. The VTG position may be set to a regular driving value of the VTG setpoint position upon reaching a parameterized exhaust gas back pressure or after the expiration of a certain time after a load change request (e.g. a full load request) and a defined opening of the VTG position with a parameterizable ramp slope as a function of the load and rotational speed.

A simplified regulation with a classic structure may also be implemented. A stationary pilot control circuit and a parallel linear controller, whose control components are added, may be used. However, no dynamic amplification effects in the model inverses are taken into account. The pilot control may be implemented as a model inverse or as a characteristic map with free parameterization (e.g. rotational speed and load).

Other mathematical methods may also be used for resolving the equation for the maximum exhaust gas back pressure ($p_{3max}$) according to VTG control criterion $u_{max}$ (maximum permissible VTG position). Iterative solution methods are also useful.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a supercharging system, including a supercharging stage, for an internal combustion engine, the supercharging stage comprising a compressor and a turbine, the turbine being settable with the aid of a variable turbine geometry (VTG) driving circuit, the method comprising:

detecting an operating state setpoint variable; and
  setting a maximum VTG control criterion for implementing a torque increase based on an engine setpoint torque by an increase of a boost pressure, the setting of the maximum VTG control criterion comprising:
    ascertaining a setpoint boost pressure;
    ascertaining a VTG setpoint position as a function of the setpoint boost pressure;
    ascertaining an actual exhaust gas back pressure;
    ascertaining an actual exhaust gas pressure downstream from the turbine;
    ascertaining a maximum exhaust gas back pressure, taking into account the actual-exhaust gas pressure downstream from the turbine; and
    determining the VTG control criteria, taking into account a difference between the actual exhaust gas back pressure and the maximum exhaust gas back pressure,
  wherein the VTG control criterion limits the VTG setpoint position to optimize progression of an actual boost pressure such that an accelerated adaptation of the actual boost pressure to the setpoint boost pressure takes place with respect to an adaptation of the actual boost pressure to the setpoint boost pressure without taking into account the VTG control criterion.

2. The method according to claim 1, wherein the ascertainment of the maximum exhaust gas back pressure comprises:

ascertaining a pressure ratio over the turbine, taking the following variables into account:
  a given pressure ratio over the compressor;
  an ambient temperature and a boost temperature upstream and downstream from the compressor;
  exhaust gas temperatures and upstream and downstream from the turbine; and/or
  the actual exhaust gas pressure.

3. The method according to claim 2, wherein the ascertainment of the pressure ratio over the turbine is determined according to a turbocharger main equation which evaluates the stationary power budget of the compressor and the turbine.

4. The method according to claim 1, wherein the ascertainment of the maximum exhaust gas back pressure includes a parameterization of a difference between a pressure difference over the compressor and a pressure difference over the turbine, taking an operating state variable into account, and wherein the maximum exhaust gas back pressure is ascertainable according to the following relationship:

$$p_{3max} = p_{2soll} - p_{1ist} + p_{4ist} + p_{off,n}$$

wherein $p_{3max}$ is the maximum exhaust gas back pressure, $p_{2soll}$ is the setpoint boost pressure, $p_{4ist}$ is the actual exhaust gas pressure, mist is an ambient pressure, and $p_{off,n}$ is the operating state variable.

5. The method according to claim 1, wherein the actual boost pressure and/or the actual exhaust gas back pressure and/or the actual exhaust gas pressure is/are determined via a sensor or is a modeled value.

6. The method according to claim 1, wherein the VTG control criterion takes place taking into account a maximum exhaust gas back pressure change.

7. The method according to claim 6, wherein the maximum exhaust gas back pressure change is determined from a parameterization of the operating state variable and the operating state setpoint variable, which is weighted according to the difference between the actual exhaust gas back pressure and the maximum exhaust gas back pressure.

8. The method according to claim 1, wherein the VTG control criteria is ascertainable according to the following relationship:

$$u_{max} = \Delta u_{p3Ctl\,max} + \Delta u_{p4} + \Delta u_T + \Delta u_{\dot{m}} + r_{Vtg}$$

where:

$$\Delta u_{p3Ctl\,max} = \alpha \cdot \dot{p}_{3mx} = \alpha \cdot K_p \cdot (p_{3max} - p_3)$$

$$\Delta u_{p4} = -\alpha \cdot \frac{\partial p_3}{\partial p_4} \cdot \dot{p}_4$$

$$\Delta u_T = -\alpha \cdot \frac{\partial p_3}{\partial T_3} \cdot \dot{T}_3$$

$$\Delta u_{\dot{m}} = -\alpha \cdot \frac{\partial p_3}{\partial \dot{m}} \dot{m}$$

and $$\alpha = \frac{\tau}{\left(\frac{\partial p_3}{\partial c_d} \cdot \frac{\partial c_d}{\partial r} + \frac{\partial p_3}{\partial A_{eff}} \cdot \frac{\partial A_{eff}}{\partial r}\right)}$$

wherein $p_3$ is a pressure upstream of the turbine, $p_4$ is a pressure downstream of the turbine, $u_{max}$ is a maximum allowed turbine actuator position, $\Delta u_{p3Ctl\,max}$ is a control error, $\Delta u_{p4}$ is a first damping variable based on a change in the pressure downstream of the turbine, $\Delta u_T$ is a second damping variable based on upstream temperatures, $\Delta_m$ is a third damping variable based on a change in turbine massflow, $r_{vtg}$ is a VTG actuator position, wherein $\alpha$ is a gain of a transfer function from a turbine actuator position to the pressure upstream of the turbine ($p_3$), $K_p$ is a proportional controller gain, $\tau$ is a time constant of a turbine actuator, $c_d$ is a correction factor of a turbine orifice based on the turbine actuator position, $A_{\textit{eff}}$ is an effective area of a turbine orifice based on the turbine actuator position, $p_{3max}$ is the maximum exhaust gas back pressure, and r is the turbine actuator position.

9. The method according to claim 2, wherein the operating state variable is an engine rotational speed, and the operating state setpoint variable is the engine setpoint torque.

10. The method according to claim 8, wherein the following variables are taken into account in determining the exhaust gas back pressure via a regulation-implemented output/input linearization: the temperature upstream from the turbine, the actual pressures upstream and downstream from the turbine, and/or a turbine mass flow.

11. The method according to claim 1, wherein the maximum exhaust gas back pressure is increased by an offset dependent on a boost pressure control deviation.

12. The method according to claim 1, wherein a progression of the setpoint boost pressure is calculated by the VTG driving circuit, wherein limiting the VTG setpoint position based on the VTG control criterion allows the boost pressure to follow the progression of the setpoint boost pressure.

13. The method according to claim 1, wherein the progression of the actual boost pressure over a period of time is non-linear.

14. The method according to claim 1, wherein the progression of the actual boost pressure over a period of time is not constant.

15. A method for controlling a supercharging system, including a supercharging stage, for an internal combustion engine, the supercharging stage comprising a compressor and a turbine, the turbine being settable with the aid of a variable turbine geometry (VTG) driving circuit, the method comprising:
  detecting an operating state setpoint variable; and
  setting a maximum VTG control criterion for implementing a torque increase by an increase of a boost pressure, the setting of the maximum VTG control criterion comprising:
    ascertaining a setpoint boost pressure;
    ascertaining a VTG setpoint position as a function of the setpoint boost pressure;
    ascertaining an actual exhaust gas back pressure;
    ascertaining an actual exhaust gas pressure downstream from the turbine;
    ascertaining a maximum exhaust gas back pressure, taking into account the actual-exhaust gas pressure downstream from the turbine; and
    determining the VTG control criteria, taking into account a difference between the actual exhaust gas back pressure and the maximum exhaust gas back pressure,
  wherein the VTG control criterion limits the VTG setpoint position such that an accelerated adaptation of an actual boost pressure to the setpoint boost pressure takes place with respect to an adaptation of the actual boost pressure to the setpoint boost pressure without taking into account the VTG control criterion,
  wherein the VTG control criterion takes place taking into account a maximum exhaust gas back pressure change,
  wherein the maximum exhaust gas back pressure change is determined from a parameterization of the operating state variable and the operating state setpoint variable, which is weighted according to the difference between the actual exhaust gas back pressure and the maximum exhaust gas back pressure, and
  wherein a correction factor, which is parameterized from the difference between the actual exhaust gas back pressure and the maximum exhaust gas back pressure is taken into account for determining the maximum exhaust gas back pressure change.

16. A control system for a supercharging system for an internal combustion engine, wherein the control system is configured to carry out the method according to claim 1.

17. An internal combustion engine comprising:
  a supercharging system having a supercharging stage, wherein the supercharging stage includes a compressor and a turbine; and
  a control system according to claim 16.

18. A motor vehicle comprising an internal combustion engine according to claim 17.

* * * * *